United States Patent [19]

Kawamoto et al.

[11] Patent Number: 5,124,934
[45] Date of Patent: Jun. 23, 1992

[54] CONSTANT FEED WATER DEVICE

[75] Inventors: Ryuichi Kawamoto; Keisuke Hirade, both of Aichi, Japan

[73] Assignee: Inax Corporation, Tokoname, Japan

[21] Appl. No.: 485,533

[22] Filed: Feb. 27, 1990

[30] Foreign Application Priority Data

Mar. 3, 1989 [JP] Japan ................. 1-24479[U]

[51] Int. Cl.$^5$ ................. G06F 15/20; G05B 11/18
[52] U.S. Cl. ..................... 364/510; 364/509;
364/479; 222/14; 222/20
[58] Field of Search ............ 364/509, 510, 479, 167.1;
239/68; 137/624.11; 222/14, 15, 20, 52

[56] References Cited

U.S. PATENT DOCUMENTS

| 3,651,989 | 3/1972 | Wostrich | 222/14 |
|---|---|---|---|
| 4,333,486 | 6/1982 | Ciccozzi | 137/1 |
| 4,417,312 | 11/1983 | Cronin et al. | 364/510 |
| 4,569,020 | 2/1986 | Snoddy et al. | 364/510 |
| 4,627,552 | 12/1986 | Yoshida et al. | 364/479 |
| 4,646,224 | 2/1987 | Ransburg et al. | 239/68 |
| 4,797,820 | 1/1989 | Wilson et al. | 364/510 |
| 4,866,633 | 9/1989 | Nakane et al. | 137/624.11 |
| 4,873,650 | 10/1989 | Reeves, Jr. | 364/510 |
| 4,875,623 | 10/1989 | Garris | 364/510 |
| 4,937,732 | 6/1990 | Brundisini | 364/510 |
| 5,040,106 | 8/1991 | Maag | 364/510 |

FOREIGN PATENT DOCUMENTS 0267701 5/1988 European Pat. Off. .

Primary Examiner—Parshotam S. Lall
Assistant Examiner—Ellis B. Ramirez
Attorney, Agent, or Firm—Kanesaka and Takeuchi

[57] ABSTRACT

A constant liquid feeding device of the invention comprises a flow meter for measuring quantity of liquid flowing through a pipe, a valve attached to the pipe, a valve control device attached to the valve for opening and closing the pipe, an operating device having a feeding switch and a learning switch, and a control unit electrically connected to the operating device and the valve control device. The control unit is provided with a first memory, a second memory and a comparing device for comparing data stored in the first and second memories. When the learning switch is actuated, the control unit operates to memorize an amount of liquid flowing through the flow meter in the first memory, wherein the amount of liquid is manually controlled by the valve control device. When the learning switch is not actuated, the control unit checks if the feeding switch is turned on. Only when the feeding switch is turned on, the control unit operates the valve control device to open the valve and to leave the valve open to supply the same amount of liquid memorized in the first memory so that the present amount of liquid can be always supplied.

3 Claims, 3 Drawing Sheets

CONSTANT FEED WATER DEVICE

BACKGROUND OF THE INVENTION

Field of the Invention and Related Art Statement

The invention relates to a constant feed water device and more particularly to a constant feed water device which is capable of simply setting an aimed feed water quantity.

There are occasions where a constant feed water device is provided for feeding water (it may be a warm water) of a constant quantity to cocks or faucets and so forth used for bath-rooms, toilet rooms, and washing machines. As the constant feed water device of this type, there have been conventionally used a mechanically driven and electrically driven constant feed water devices. The electrically driven constant feed water device is extensively used which comprises a flow meter for measuring the quantity of feed water, a comparing means in which a detected quantity of the feed water of the above flow meter is inputted and the integrated flow rate and the set quantity of feeding water are compared, a controller which outputs a valve closing signal when the integrated flow rate has reached the set quantity of feeding water, a valve which is closed by the above valve closing signal, and a feed water starting means which opens the above valve. As the feed water starting means, a feed water switch is used for example.

In a conventional constant feed water device, the aimed feed water quantity is set by a setting means such as a dial. The dial is marked out, for example, every 10 liters of the set quantity of feed water and the desired aimed feed water quantity is set by turning the dial.

A constant feed water device for bathtub has been used, in which a pressure sensor detects the water level in the bathtub so that water is stored up to a predetermined level in accordance with the detected water level.

In cases where the aimed feed water quantity is set by a setting means such as a dial, the setting range of the aimed feed water quantity is limited to the range of numerical values graduated on the dial, so that the applications of the constant feed water device are limited, for example, to bathtubs, washbowls or washing machines. That is, in the case of a constant feed water device for bathtub, because the aimed feed water quantity will generally be set in a range from 100 to 300 liters, graduations thereof will also be set in such range with increments of about 5 to 20 liters, while in the case of a constant feed water device for washbowl, graduations, for example, with less increments ranging from about 0.1 to 0.5 liters are provided on the dial, so that it is impossible for the same constant feed water device to feed water to both the bathtub and washbowl.

In case, for example, where 200 liters of water is to be supplied, it is not known how high the level of the water to be stored in the bathtub will be until the user of the constant feed water device has repeatedly used the device and recognized the level of the stored water empirically. Therefore, if the user is not experienced in using the constant feed water device or if a bathtub, washing machine of washbowl is changed to that with different volume, it has been quite difficult for the user to set the feed water quantity to the level of the aimed feed water quantity.

In a constant feed water device wherein the level of the water in the bathtub is detected by a pressure sensor, its application will be limited almost to bathtub and thus an execution of work for installing a pressure sensor on the body of the bathtub becomes necessary.

OBJECT AND SUMMARY OF THE INVENTION

The present invention, therefore, has as its principal object the provision of a novel constant feed water device which is capable of storing a desired quantity of feed water into the device while actually verifying such quantity, thereby facilitating accurate setting of the desired quantity of feed water.

It is another object of the present invention to provide a constant feed water device which can be adapted as it is to various applications such as to bathtub, washbowl, and washing machine because the range of the set quantity of the feed water is not limited.

It is a further object of the present invention to provide a constant feed water device which facilitates installation and work execution thereof extremely because the installation of the device according to the present invention can be accomplished by simply incorporating a valve and a flow meter into the feed water pipe and by mounting a controller on the device.

The constant feed water device according to the present invention relates to an improvement thereof which comprises a flow meter for measuring the quantity of the water to be fed, a comparing device for inputting the detected feed water quantity of the foregoing flow meter and for comparing the integrated flow rate and the set quantity of the feed water, a controller for outputting a valve closing signal when the integrated flow rate has reached the set quantity of the feed water, a valve which is closed by the foregoing valve closing signal, and a feed water starting device for opening the foregoing valve.

In the present invention, the foregoing controller comprises a learning switch for outputting numerical signals of a feed water learning mode, a memory switch for outputtings which specify to store the integrated flow rate, and a device for storing the integrated flow rate as the set feed water quantity according to the numerical signals of the feed water learning mode of the foregoing learning switch and the signals from the foregoing memory switch. In addition, the abovementioned comparing device is so constructed as to compare the set feed water quantity and the integrated flow rate stored in the foregoing memory device.

In the constant feed water device according to the present invention, the learning mode is selected by the learning switch and water feeding is started by the feed water starting means to cause the water to be stored in the bathtub. The level of the stored water is then visually observed and the memory switch is operated when the level of the stored water has reached the desired level, and the integrated quantity of the fed water after starting water feeding is caused to be stored as the set quantity of the feed water. If the learning mode is not selected and the water feeding is started, the controller compares the integrated quantity of the fed water after starting water feeding with the set quantity of the feed water and the valve closing signal is issued to cause the water feeding to be stopped when the integrated quantity of the fed water has reached the set quantity of the feed water.

As have been stated above, in the constant feed water device according to the present invention, it is possible to visually confirm the actual quantity of the stored water and establish the set quantity of the feed water.

Therefore, it is possible to set accurately an aimed quantity of the feed water by one water storing operation.

PREFERRED EMBODIMENTS

Figure 1:
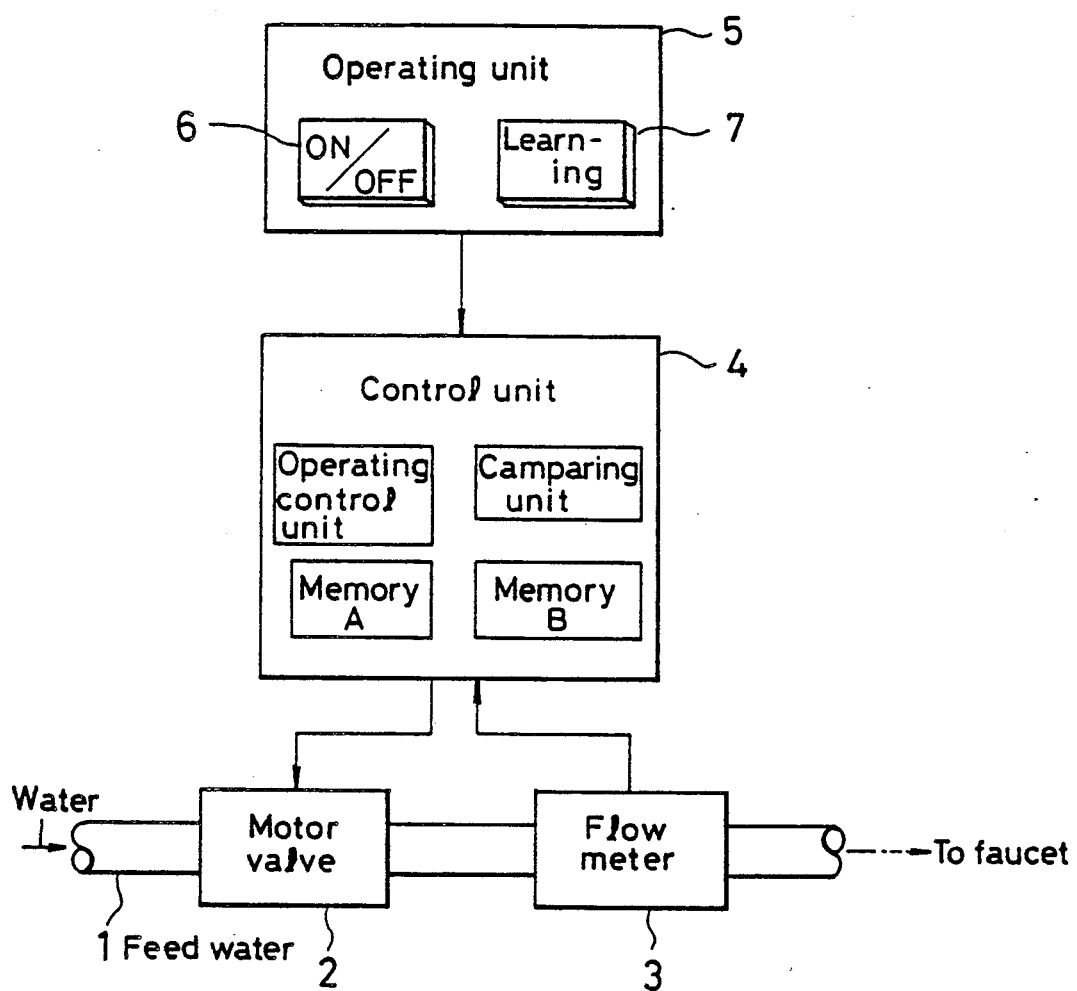
FIG. 1 is a system diagram showing a construction of the constant feed water device in connection with an embodiment of the present invention.

In FIG. 1, in the middle of the feed pipe 1 are provided a motor valve 2 and a flow meter 3, and the detection signal of the flow meter 3 is stored in a controller 4. In the controller 4 are also inputted signals from an operating unit 5 and control signals are outputted from the controller 4 to the motor valve 2. The operating unit 5 comprises a feed water/stop water switch for selecting the feeding of water and the stopping of water (shown as an ON/OFF code in the diagram) 6 and a learning switch 7 for selecting the feed water learning mode. The controller 4 comprises an operation control unit for driving the motor valve 4 and a comparing unit, a memory A, and a memory B for outputting control signals to the foregoing operation control unit. The operation control unit, comparing unit, memory A and B are arranged in a microcomputer as described in a later part. In an embodiment of the present invention, ON/OFF switch 6 functions as a memory switch.

Figure 2:
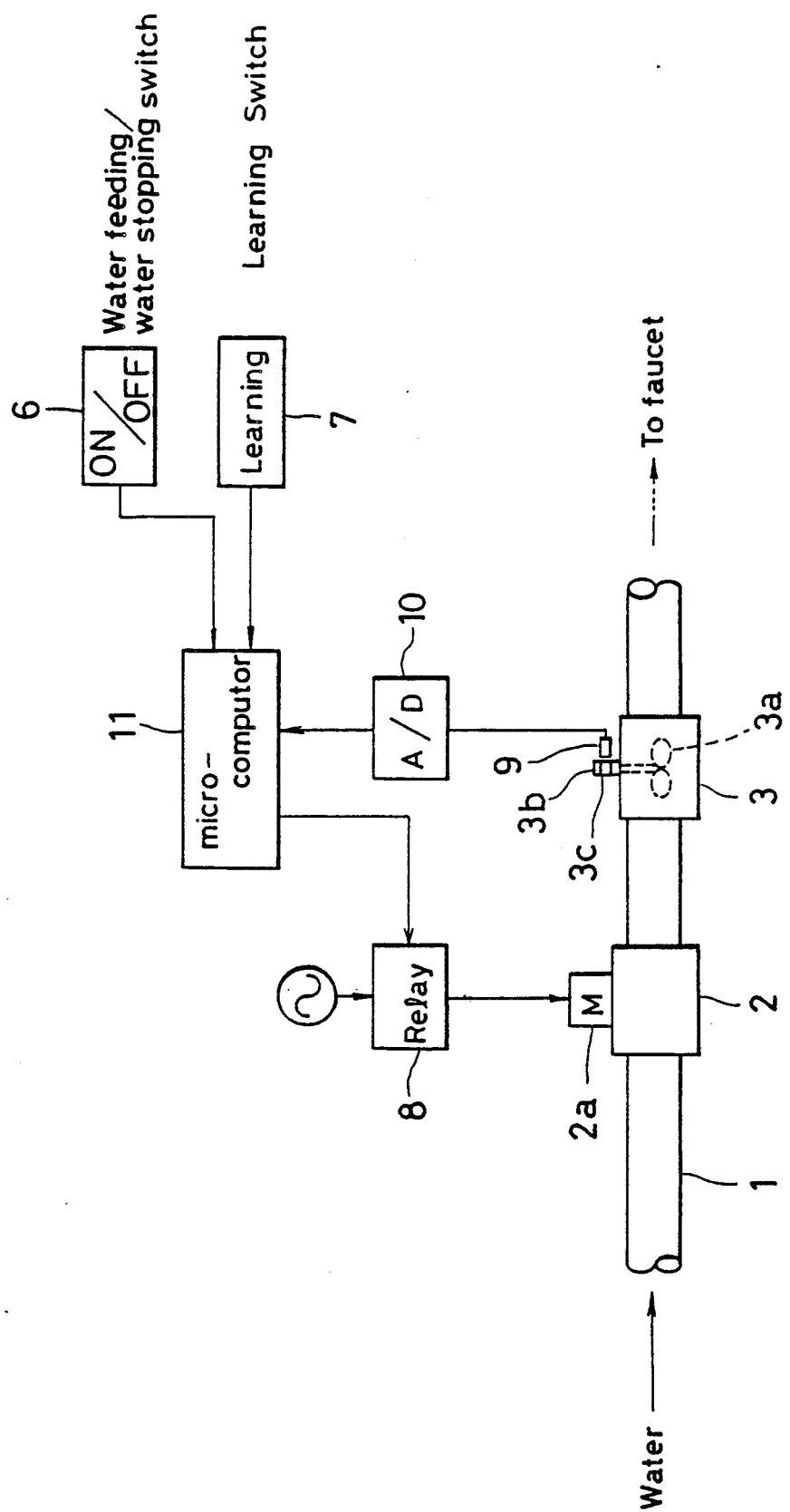
FIG. 2 is a block diagram.

As shown in FIG. 2, the motor valve 2 has a motor 2a for opening and closing the motor valve and the foregoing motor 2a is driven by commercial power source supplied through a relay 8 or by the battery power source. This relay 8 is composed so as to rotate the motor 2a in forward and reverse directions. The flow meter 3 is equipped with a propeller 3a and a magnetic sensor 9 is installed in the proximity of a magnet 3c provided on a shaft 3b of the foregoing propeller 3a. Each time the shaft 3b makes one turn, the foregoing sensor 9 outputs a signal of one pulse. Detection signals of the sensor 9 are stored into a microcomputer 11 through an A/D converter 10. The microcomputer 11 issues control signals to the foregoing relay 8. The microcomputer 11 is stored with signals of the ON/OFF switch 6 and the learning switch 7. The microcomputer 11 consists of well-known structure and composed of a ROM for storing programs, a ROM for temporarily storing data and the like, a CPU or central processing unit, an input-output device, and data buses and the like for connecting the foregoing components.

Figure 3:
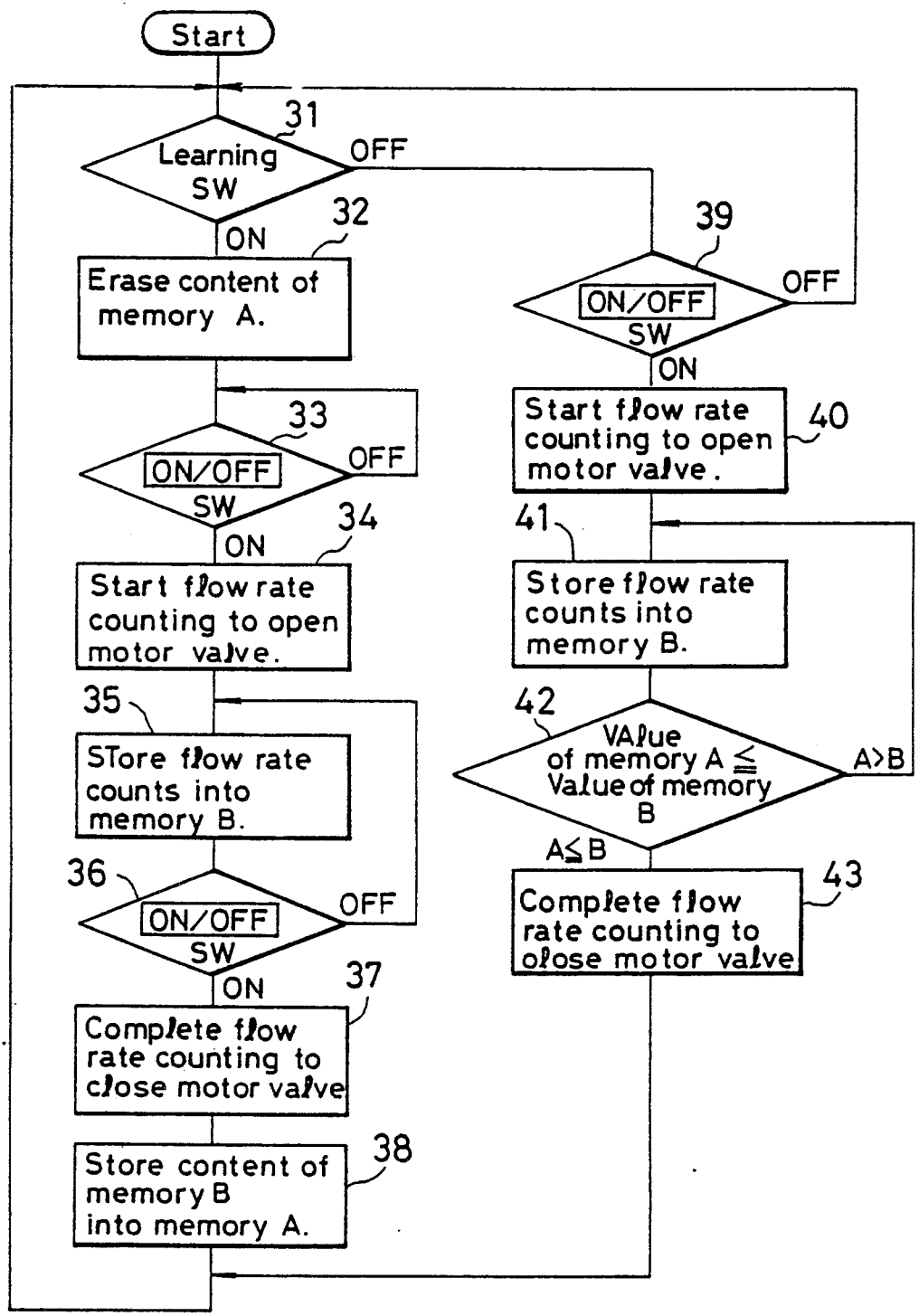
FIG. 3 is a flowchart.

Referring to FIG. 3, there is shown control programs stored in the microcomputer 11.

In FIG. 3, when a control starts, whether the learning switch 7 is ON o OFF is decided in a step 31 in the first place. If the learning switch is ON, the program proceeds to a step 32 where the memory content of the memory A is erased, then the program proceeds to a step 33 and waits there until the water feeding/water stopping switch (ON/OFF switch) is turned ON. When the water feeding/water stopping switch 6 is turned ON, the program shifts to a step 34, causing the motor valve 2 to open and close. By these operations, the flow meter 3 starts actuating. The program shifts from the step 34 to the step 35, causing the flow meter 3 to integrate (count) the flow rate thereof and the integrated flow rate to be stored in the memory B. Then, the program moves to a step 36 to decide whether the water feeding/water stopping switch 6 has been pressed. If the water feeding/water stopping switch 6 has not been pressed after the foregoing water feeding operation, the result of decision is OFF and returned from the step 36 to the step 35 and the water feeding and integration of the flow rate are continued. If the water feeding/water stopping switch 6 is pressed once again after the foregoing water feeding operation and the water stopping is selected, the program shifts from the step 36 to the step 37, causing the motor valve 2 to close. These operations complete the counting of the flow rate. The program then shifts to the step 38 to store the content of the memory in the memory A, data of the memory B are erased, and the program returns to the step 31.

In the step 31, if the learning switch 7 is OFF, the program shifts to the step 39 and decides whether the water feeding/water stopping switch 6 has been pressed. If the water stopping mode of the water feeding/water stopping switch 6 is selected, the program returns to the step 31, and if the water feeding mode thereof is selected, the program shifts from the step 39 to the step 40, causing the motor valve 2 to open. By such operations, the counting of the flow rate is started. The program then shifts to the step 41 to obtain the integrated flow rate after counting the signal from the flow meter 3 and stores the obtained integrated flow rate in the memory B. The program will then be shifted to the step 42 to compare the value of the memory A with the value of the memory B. If the value of the memory A is greater than the value of the memory B, the program returns to the step 41 and the water feeding and flow rate counting are continued. As a result of the decision made by the step 42, if the value of the memory B becomes greater than the value of the memory A, the program shifts to the step 43, causing the motor valve 2 to close. According to these operations, the counting of flow rate is also completed. Afterward, the program returns to the step 31.

As is apparent from the description of the program shown in FIG. 3, the integrated quantity of the feed water actually fed in steps 32 through 38 is stored in the memory A. Therefore, it becomes possible to feed water accurately up to the level of water established while actually observing it.

In the foregoing embodiment, the water feeding/water stopping switch 6 is provided with the function of a memory switch, however, a special memory switch may be provided in the present invention, for outputting the signal to specify the program in addition to the water feeding/water stopping switch.

In the foregoing embodiment, it is arranged so as to set one type of set quantity of the feed water, however, in the present invention, the number of memory may be increased so as to set a plurality of aimed quantity of the feed water. Further, in the foregoing embodiment, a motor valve which is driven by the motor 2a is adopted, but it is possible to employ various valves such as a solenoid valve. Furthermore, a flow meter of various composition other than the above can be used.

What is claimed is:

1. A constant liquid feeding device for supplying a predetermined amount of liquid through a pipe, comprising;

a flow meter for measuring quantity of liquid flowing through the pipe, a valve attached to the pipe for opening and closing the pipe, valve control means connected to the valve for opening and closing the pipe, operating means having a feeding switch and a learning switch, and a control unit electrically connected to the operating means and the valve control means, said control unit having a first memory, a second memory and comparing means for comparing data stored in the first and second memories, said control unit, (1) when the learning switch is actuated, operating to memorize an amount of liquid flowing through the flow meter in the first memory, said amount of liquid being manually controlled by the valve control means by actuating the feeding switch, and (2) when the learning switch is not actuated, checking if the feeding switch is turned on, and operating the valve control means to open the valve only when the feeding switch is turned on and to leave the valve open to supply same amount of liquid memorized in the first memory so that preset amount of liquid can be always supplied.

2. A constant liquid feeding device according to claim 1, wherein said control unit, when the learning switch is not actuated, has a function such that an amount of liquid passing through the pipe is measured by the flow meter and is memorized in the second memory, said comparing means comparing the data in the first and second memories and when the data in the second memory is equivalent to the data in the first memory, the valve control means being closed so that preset amount memorized in the first memory is always supplied.

3. A constant liquid feeding device according to claim 2, wherein data in the first memory is eliminated whenever the learning switch is actuated, and new data measured by the flow meter is memorized in the first memory.

* * * * *